(12) United States Patent
Karjalainen et al.

(10) Patent No.: US 12,317,099 B2
(45) Date of Patent: May 27, 2025

(54) FACILITATING NETWORK ASSISTED OVERHEAD REDUCTION IN D2D DISCOVERY PROCEDURE

(71) Applicant: Nokia Technologies Oy, Espoo (FI)

(72) Inventors: Juha Pekka Karjalainen, Oulu (FI); Timo Koskela, Oulu (FI); Sami-Jukka Hakola, Kempele (FI); Jari Yrjana Hulkkonen, Oulu (FI); Antti Arvola, Oulu (FI); Satya Krishna Joshi, Oulu (FI); Antti Tolli, Oulu (FI)

(73) Assignee: Nokia Technologies Oy, Espoo (FI)

( * ) Notice: Subject to any disclaimer, the term of this patent is extended or adjusted under 35 U.S.C. 154(b) by 444 days.

(21) Appl. No.: 17/779,638

(22) PCT Filed: Sep. 25, 2020

(86) PCT No.: PCT/EP2020/076932
§ 371 (c)(1),
(2) Date: May 25, 2022

(87) PCT Pub. No.: WO2021/104714
PCT Pub. Date: Jun. 3, 2021

(65) Prior Publication Data
US 2023/0012726 A1    Jan. 19, 2023

Related U.S. Application Data

(60) Provisional application No. 62/940,495, filed on Nov. 26, 2019.

(51) Int. Cl.
H04W 16/28     (2009.01)
H04B 7/06      (2006.01)
(Continued)

(52) U.S. Cl.
CPC .......... *H04W 16/28* (2013.01); *H04B 7/0617* (2013.01); *H04W 8/005* (2013.01); *H04W 16/14* (2013.01); *H04W 24/10* (2013.01)

(58) Field of Classification Search
CPC . H04B 7/0617; H04B 7/06954; H04W 8/005; H04W 16/14; H04W 16/28; H04W 24/10
See application file for complete search history.

(56) References Cited

U.S. PATENT DOCUMENTS 9,258,046 B2 *  2/2016  Sinha .................... H04W 16/28
9,668,232 B2 *  5/2017  Patil ..................... H04W 8/005
(Continued)

FOREIGN PATENT DOCUMENTS

CN   106068668 A  * 11/2016  ............ H04W 72/02
CN   106068668 B  * 11/2019  ............ H04W 72/02
(Continued)

OTHER PUBLICATIONS

Sim, Gek Hong (Allyson), et al., "5G Millimeter-Wave and D2D Symbiosis: 60 GHz for Proximity-Based Services", © 2017 IEEE, 6 pgs.

*Primary Examiner* — Eric Nowlin
(74) *Attorney, Agent, or Firm* — Barta Jones, PLLC (57) ABSTRACT

An example method, apparatus, and computer-readable storage medium are provided for enabling beam based discovery and direct connectivity using network assisted beam discovery and corresponding signaling to at least reduce sweep time and beam acquisition for D2D discovery operations. In an example implementation, the method may include determining, by a network device of a communication network, information including an indication of at least one of data, a control element, or a relative reference point for identifying a beam sweeping angular spread for device-to-device discovery operations for device-to-device communication. The example method may further include sending towards a (Continued)

set of network nodes the information for the device-to-device discovery in the communication network.

18 Claims, 3 Drawing Sheets

(51) Int. Cl.
*H04W 8/00* (2009.01)
*H04W 16/14* (2009.01)
*H04W 24/10* (2009.01)

(56) References Cited

U.S. PATENT DOCUMENTS

| | | | | |
|---|---|---|---|---|
| 9,848,454 B2* | 12/2017 | Patil | | H04W 72/1263 |
| 9,867,115 B2* | 1/2018 | Sinha | | H04B 7/0491 |
| 9,936,376 B2* | 4/2018 | Yu | | H04W 8/005 |
| 10,154,531 B2* | 12/2018 | Liao | | H04W 72/51 |
| 10,490,895 B2* | 11/2019 | Abdallah | | H01Q 3/34 |
| 10,630,358 B2* | 4/2020 | Hakola | | H04W 48/08 |
| 10,707,934 B2* | 7/2020 | Oteri | | H04B 7/0491 |
| 10,728,733 B2* | 7/2020 | Abouelseoud | | H04W 48/12 |
| 10,741,911 B2* | 8/2020 | Abdallah | | H04B 7/0695 |
| 10,813,041 B2* | 10/2020 | Abouelseoud | | H04W 48/10 |
| 10,841,781 B2* | 11/2020 | Abedini | | H04W 48/16 |
| 10,848,205 B2* | 11/2020 | Kim | | H04B 7/08 |
| 10,912,100 B2* | 2/2021 | Lee | | H04W 72/12 |
| 11,044,596 B2* | 6/2021 | Tirkkonen | | H04W 72/29 |
| 11,070,267 B2* | 7/2021 | Hakola | | H04W 48/08 |
| 11,229,070 B2* | 1/2022 | Chae | | H04W 24/08 |
| 11,444,668 B2* | 9/2022 | Badic | | G01S 19/01 |
| 11,533,092 B2* | 12/2022 | Wee | | H04W 48/16 |
| 11,626,920 B2* | 4/2023 | Lee | | H04W 76/19 370/329 |
| 12,089,066 B2* | 9/2024 | Kiilerich Pratas | | H04B 7/0695 |
| 12,167,254 B2* | 12/2024 | Karjalainen | | H04W 16/28 |
| 2015/0103756 A1* | 4/2015 | Sinha | | H04W 16/28 342/372 |
| 2015/0215981 A1* | 7/2015 | Patil | | H04W 72/02 370/329 |
| 2016/0142965 A1* | 5/2016 | Sinha | | H04W 40/244 370/328 |
| 2016/0219574 A1* | 7/2016 | Ribeiro | | H04W 52/0229 |
| 2016/0269887 A1* | 9/2016 | Kim | | H04W 76/14 |
| 2016/0295542 A1* | 10/2016 | Patil | | H04W 8/005 |
| 2017/0034687 A1* | 2/2017 | Yu | | H04W 72/04 |
| 2017/0041974 A1* | 2/2017 | Liao | | H04B 7/0452 |
| 2017/0245134 A1* | 8/2017 | Patil | | H04W 60/005 |
| 2017/0352954 A1* | 12/2017 | Abdallah | | H01Q 3/34 |
| 2018/0294860 A1* | 10/2018 | Hakola | | H04W 16/28 |
| 2018/0343605 A1* | 11/2018 | Wu | | H04W 72/0446 |
| 2018/0368144 A1* | 12/2018 | Xiong | | H04B 7/024 |
| 2019/0081674 A1* | 3/2019 | Oteri | | H04B 7/0617 |
| 2019/0082379 A1* | 3/2019 | Abouelseoud | | H04W 16/28 |
| 2019/0173533 A1* | 6/2019 | Kim | | H04B 7/0695 |
| 2019/0222995 A1* | 7/2019 | Abouelseoud | | H04W 16/28 |
| 2019/0253867 A1* | 8/2019 | Abedini | | H04J 13/0062 |
| 2019/0319693 A1* | 10/2019 | Ciochina | | H04B 7/0452 |
| 2020/0015298 A1* | 1/2020 | Chae | | H04B 7/063 |
| 2020/0044337 A1* | 2/2020 | Abdallah | | H04B 7/088 |
| 2020/0059284 A1* | 2/2020 | Abouelseoud | | H04W 72/046 |
| 2020/0154347 A1* | 5/2020 | Abouelseoud | | H04W 8/005 |
| 2020/0228957 A1* | 7/2020 | Tirkkonen | | H04W 8/005 |
| 2020/0229029 A1* | 7/2020 | Yasukawa | | H04B 1/713 |
| 2020/0229067 A1* | 7/2020 | Hashemi | | H04B 7/0617 |
| 2020/0313740 A1* | 10/2020 | Wee | | H04W 28/06 |
| 2021/0029620 A1* | 1/2021 | Wu | | H04L 5/001 |
| 2021/0058914 A1* | 2/2021 | Chae | | H04B 7/0695 |
| 2021/0297128 A1* | 9/2021 | Badic | | G01S 5/0284 |
| 2021/0336688 A1* | 10/2021 | Lee | | H04W 4/40 |
| 2021/0400448 A1* | 12/2021 | Adjakple | | H04W 4/40 |
| 2022/0046404 A1* | 2/2022 | Ljung | | H04L 5/0053 |
| 2023/0008786 A1* | 1/2023 | Karjalainen | | H04B 7/06954 |
| 2023/0012726 A1* | 1/2023 | Karjalainen | | H04B 7/0617 |
| 2023/0072170 A1* | 3/2023 | Kiilerich Pratas | | H04B 7/0695 |

FOREIGN PATENT DOCUMENTS

| | | | | |
|---|---|---|---|---|
| CN | 112335188 A | * | 2/2021 | G01S 19/01 |
| CN | 108352868 B | * | 12/2022 | H04B 7/0408 |
| EP | 3065479 A1 | * | 9/2016 | H04W 72/02 |
| EP | 3130162 B1 | * | 12/2019 | H04W 72/04 |
| EP | 3471285 B1 | * | 3/2020 | H04B 7/0404 |
| EP | 3664310 A1 | * | 6/2020 | G01S 19/01 |
| EP | 3403427 B1 | * | 10/2021 | H04W 28/26 |
| JP | 2019512939 A | * | 5/2019 | |
| KR | 20180016301 A | * | 2/2018 | |
| KR | 20210082224 A | * | 7/2021 | |
| KR | 102441129 B1 | * | 9/2022 | |
| TW | 201740695 A | * | 11/2017 | H04B 7/0421 |
| WO | WO-2015019127 A1 | * | 2/2015 | H04W 48/02 |
| WO | WO-2015116421 A1 | * | 8/2015 | H04W 72/02 |
| WO | WO-2015155573 A1 | * | 10/2015 | H04W 72/04 |
| WO | WO-2017063661 A1 | * | 4/2017 | H04B 7/0408 |
| WO | WO-2017111642 A1 | * | 6/2017 | |
| WO | WO-2017121469 A1 | * | 7/2017 | H04W 28/26 |
| WO | WO-2017156366 A1 | * | 9/2017 | H04B 7/0421 |
| WO | WO-2018026218 A1 | * | 2/2018 | H04B 7/0404 |
| WO | WO-2019199146 A1 | * | 10/2019 | H04W 16/28 |
| WO | WO-2020067949 A1 | * | 4/2020 | H04L 1/0004 |
| WO | WO-2020092742 A1 | * | 5/2020 | H04W 4/40 |
| WO | WO-2020114651 A1 | * | 6/2020 | G01S 19/01 |

* cited by examiner

410: determining, by a network device of a communication network, information comprising an indication of at least one of data, a control element, or a relative reference point for identifying a beam sweeping angular spread for device-to-device discovery operations for device-to-device communication between a set of network nodes of the communication network 420: sending towards the set of network nodes the information for the device-to-device discovery in the communication network

FIG. 4A

450: receiving from a network device, by a network node of a communication network, information comprising an indication of at least one of data, a control element, or a relative reference point for identifying a beam sweeping angular spread for device-to-device discovery operations for device-to-device communication with another network node of a set of network nodes of the communication network 460: based on the information, performing spatial domain configured discovery signalling for the device-to-device discovery operations

FIG. 4B

FACILITATING NETWORK ASSISTED OVERHEAD REDUCTION IN D2D DISCOVERY PROCEDURE

CROSS REFERENCE TO RELATED APPLICATION

This patent application is a U.S. National Stage application of International Patent Application Number PCT/EP2020/076932 filed Sep. 25, 2020, which is hereby incorporated by reference in its entirety, and claims priority to U.S. provisional application 62/940,495 filed Nov. 26, 2019, which is hereby incorporated by reference in its entirety.

TECHNICAL FIELD

The teachings in accordance with the exemplary embodiments of this invention relate generally to beam based discovery and direct connectivity for device-to-device communication and, more specifically, relate to beam based discovery and direct connectivity using network assisted beam discovery and corresponding signaling to reduce sweep time and beam acquisition for D2D discovery operations.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AoA Angle of Arrival
CE Control Element
CSI-RS Channel State Information Reference Signal
CORESET Control Resource Set
D2D Device-to-Device
DL Downlink
DCI Downlink Control Information
MAC CE Medium Access Control Control Element
gNB New Generation NodeB
PBCH Physical Broadcast Channel
PDCCH Physical Downlink Control Channel
PDSCH Physical Downlink Shared Channel
PRACH Physical Random Access Channel
PRS Positioning Reference Signal
QCL Quasi-Colocation
RRC Radio Resource Control
RX Receive
RS Reference Signal
SSB Synchronization Signal Block
TX Transmit One type of communication technology in which a network node such as a device such as wireless terminal or network node communicates directly with another wireless terminal or network node is referred to as device-to-device (D2D) or sidelink communication. The D2D communication can require discovery operations and beam discovery for setting up the direct communications with another device.

Example embodiments of the invention work to provide new and improved methods and apparatus to perform at least these requirements for D2D communication.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION:

In this invention, there is provided at least a method and apparatus that enables beam based discovery and direct connectivity using network assisted beam discovery and corresponding signaling to at least reduce sweep time and beam acquisition for D2D discovery operations.

Example embodiments of this invention can be related to 3GPP NR radio-technology enhancements at the time of this application. Though, it is noted that any reference to NR/LTE in this application is used as example to describe the example embodiments of the invention, and other technologies can also apply this invention.

In accordance with an example embodiment of the invention there is provided at least a method and apparatus for network-assisted initial beam discovery and the corresponding signaling to reduce the sweeping time and latency for beam acquisition between device-to-device (D2D) users for purposes of beam based discovery and direct connectivity.

Moving on to higher frequencies, the device-to-device (D2D) connectivity may need to employ analog frontends with multiple beam patterns in spatial domain to combat the difficult characteristics of the channel, e.g., signal attenuation. An initial access therefore requires the use of synchronization signal blocks (SSB), assigned for each unique analog beam, to sweep in spatial domain through the possible combinations of transmit (TX) and receive (RX) beams. This kind of beam acquisition selects the pair of beams best suited for the D2D connection. However, it is noted that as the number of antennas N grows in the higher frequencies, the set of possible beam combinations increases as $N^2$. This results in longer beam acquisition latency as the SSB burst is extended and the number of bursts grows with N in linear fashion.

To reduce the resource overhead and latency required by full beam acquisition between the TX and RX users, example embodiments of the invention provide a network-assisted method to reduce the initial set of possible spatial domain angles based on where the D2D users are located and the knowledge about surrounding radio environment. In accordance with an example embodiment of the invention this can be accomplished by exploiting various levels of information regarding user positions and the environment around the serving New Generation NodeB (gNB), and this way limiting the beam sweep spatial domain angles for analog beam acquisition of the D2D pair devices.

Figure 3:
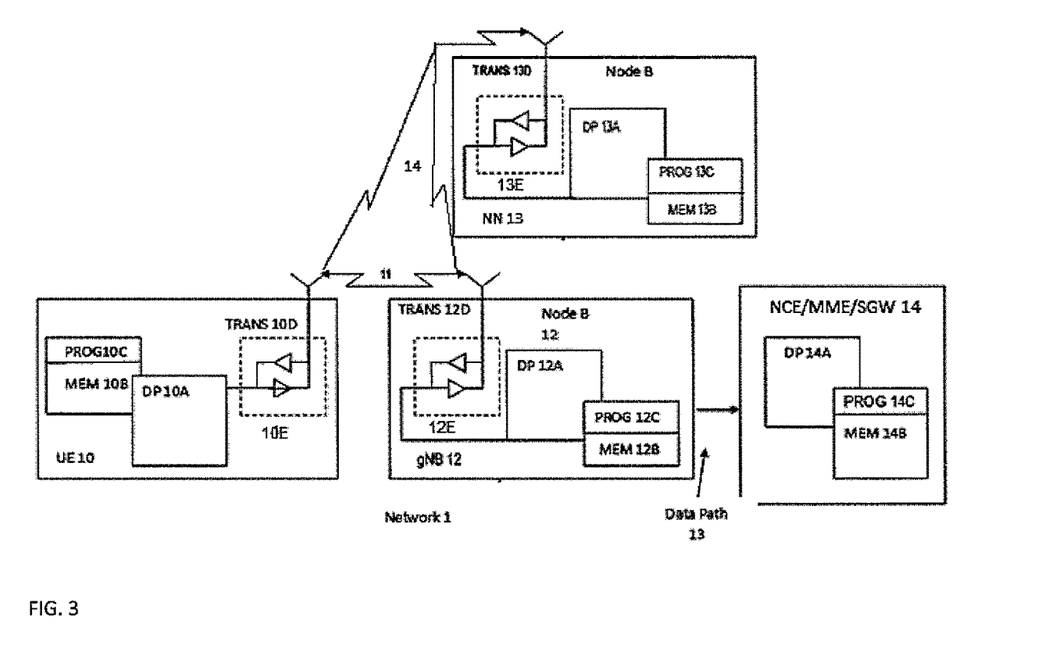
FIG. 3 shows a simplified block diagram of various electronic devices that can be used for practicing the example embodiments of the invention.

Before describing the example embodiments of the invention in detail, reference is made to FIG. 3 for illustrating a simplified block diagram of various electronic devices that are suitable for use in practicing the example embodiments of this invention.

FIG. 3 shows a block diagram of one possible and non-limiting exemplary system in which the example embodiments of the invention may be practiced. In FIG. 3, a user equipment (UE) 10 is in wireless communication with a wireless network 1 shown as Network 1 in FIG. 3. Network 1 is a radio technology network which includes or is associated with all the devices in FIG. 3. A UE is a wireless, typically mobile device that can access a wireless network. The UE 10 as shown in FIG. 3 includes one or more processors DP 10A, one or more memories MEM 10B, and one or more transceivers TRANS 10D interconnected through one or more buses 10E. Each of the one or more transceivers TRANS 10D includes a receiver and a transmitter. The one or more buses 10E may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication over wireless link 11 and/or 14 to gNB 12 and NN 13, respectively. The one or more memories MEM 10B include computer program code PROG 10C. The UE 10 communicates with gNB 12 and/or NN 13 via a wireless link 11 and/or 14.

The gNB 12 (NR/5G Node B or possibly an evolved NB or any other similar type of NW node) is a base station such as a master or secondary node base station (e.g., for NR or LTE long term evolution) that communicates with devices such as NN 13 and UE 10 of FIG. 3. The gNB 12 provides access to wireless devices such as the UE 10 to the wireless network 1. The gNB 12 includes one or more processors DP 12A, one or more memories MEM 12B, and one or more transceivers TRANS 12D interconnected through one or more buses 12E. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the gNB 12 to perform one or more of the operations as described herein. The gNB 12 may communicate with another gNB or eNB, or a device such as the NN 13. Further, the wireless link 11 and or any other link may be wired or wireless or both and may implement, e.g., an X2 or Xn interface. Further the wireless link 11 may be through other network devices such as, but not limited to an NCE/MME/SGW device such as the NCE/MME/SGW 14 of FIG. 3. Data path 13 provides connectivity between the gNB 12 and the NCE/MME/SGW 14.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the gNB 12 and/or UE 10 and/or the wireless network 1. The NN 13 includes one or more processors DP 13A, one or more memories MEM 13B, one or more network interfaces, and one or more transceivers TRANS 13D interconnected through one or more buses 13E. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the gNB 12 and the UE 10 or any other device using, e.g., wireless link 11, wireless link 14, or another link. These links maybe wired or wireless or both and may implement, e.g., an X2 or Xn interface. Further, as stated above the wireless link 11 or wireless link 14 may be through other network devices such as, but not limited to an NCE/MME/SGW device such as the NCE/MME/SGW 14 of FIG. 3. The NCE/MME/SGW 14 including MME (Mobility Management Entity)/SGW (Serving Gateway) functionality, such as User Plane Functionalities, and/or an Access Management functionality for LTE and similar functionality for 5G or any other radio technology.

The one or more buses 10E, 12E, and/or 13E of the devices of FIG. 3 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH) or transmission reception point (TRP), with the other elements of the gNB 12 being physically in a different location from the RRH/TRP, and the one or more buses 12E could be implemented in part as fiber optic cable to connect the other elements of the gNB 12 to a RRH/TRP.

It is noted that although FIG. 3 shows a network node or base station such as the gNB 12 as in FIG. 3 and mobility management device such as the NN 13 as in FIG. 3, these devices can incorporate or be incorporated into an eNodeB or eNB or gNB such as for LTE and NR, and would still be configurable to perform example embodiments of the invention as described in this application.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a network control element (NCE/MME/SGW) 14 that may include NCE (Network Control Element), MME (Mobility Management Entity)/SGW (Serving Gateway) functionality, and which provides connectivity with a further network, such as a telephone network and/or a data communications network (e.g., the Internet). The gNB 12 and the NN 13 are coupled via a link 13 and/or link 14 to the NCE/MME/SGW 14. In addition, it is noted that the operations in accordance with example embodiments of the invention, as performed by the NN 13, may also be performed at the NCE/MME/SGW 14.

The NCE/MME/SGW 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM14B and the computer program code PROG 14C are configured to, with the one or more processors DP 14A, cause the NCE/MME/SGW 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10A, DP12A, DP13A, and/or DP14A and memories MEM 10B, MEM 12B, MEM 13B, and/or MEM 14B, and also such virtualized entities create technical effects.

The computer readable memories MEM 10B, MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 10B, MEM 12B, MEM 13B, and MEM 14B may be means for performing storage functions. The processors DP10A, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10A, DP12A, DP13A, and DP14A may be means for performing functions, such as controlling the UE 10, gNB 12, NN 13, NCE/MME/SGW 14 and other functions as described herein.

In accordance with example embodiments of the invention there is at least:
1. Definition of a reference/anchor point for assisting transmitting and receiving UEs for defining beam sweeping angular spread for D2D discovery;
2. gNB providing transmitting UE with angular parameters and accompanied transmission resources;
3. gNB providing receiving UE with angular parameters and accompanied reception resources; and
4. UE provides assistance information for sweep range reduction to network in separate message or in a request message In accordance with example embodiments of the invention there is a dynamic triggering mechanism at a network device such as a base station to provide assistance information to for network nodes such as user equipment to perform reception of discovery signal for D2D or sidelink communication.

In accordance with an example embodiment of the invention a dynamic triggering mechanism can provide assistance information for a set of network nodes (e.g. UEs or sidelink UEs) to transmit in a spatial domain (i.e. azimuth and/or elevation) a configured discovery signal, e.g., synchronization signal block (SSB) or sidelink (SL) SSB resources and/or uplink (UL) reference signal (RS) (e.g. sounding reference signal (SRS)) or UL signal (e.g. PRACH) resources.

In accordance with an example embodiment of the invention this dynamic triggering mechanism can comprise assistance information that can consist of relative TX reference/anchor point and/or TX sweep range of spatial filter(s) associated with the network node;

In accordance with example embodiments of the invention this dynamic triggering mechanism can result in operations that can include:
Relative reference/anchor point can be defined as at least one of the following elements:
 a compass direction (e.g. north) and/or offset value in angular domain with respect to the compass direction,
 Transmission Configuration Indicator (TCI) state associated with a Control resource set (CORESET) or TCI of physical downlink shared channel (PDSCH) or the DL RS resource that is the QCL source or TCI state of physical uplink shared channel or TCI state of physical uplink control channel,
 SS/PBCH Block Index of the serving cell,
 CSI-RS resource index/channel state resource indicator (CRI) (wherein a CSI-RS may be associated to specific TRP),
 PRS resource index, e.g. if UE has active positioning service running at the network, and
 SRI, SRS Resource Indicator;
TX beam sweep range in spatial domain can be defined as at least one of the following elements:
 Relative angle spread in azimuth domain given by +−x degrees with respect to the relative reference point. The angle spread can be a bit vector with length of L-bits, where each element of the vector is mapped with some RRC/MAC CE pre-configured angle spread values,
 Relative angle spread in elevation domain given by +−y degrees with respect to the relative reference point. The angle spread can be a bit vector with length of L-bits, where each element of the vector is mapped with some RRC/MAC CE pre-configured angle spread values,
 Granularity of the sweep in azimuth and/or elevation domains according to capability of network device. The sweep granularity information can be also used to control coverage of the transmission. The sweeping granularity can be a bit vector with length of K-bits, where each element of the vector is mapped with some RRC/MAC CE pre-configured sweep granularity values;
Triggering mechanism can be based on physical layer signaling (e.g. DCI via PDCCH) and/or multiple access (MAC) layer via control element (MAC CE) and/or radio resource control (RRC) signaling;

Further, in accordance with example embodiments of the invention there is a dynamic triggering mechanism to provide assistance information for a set of network nodes (e.g. UEs or sidelink UEs) to perform reception of discovery signal, i.e. SSB or SL SSB and/or uplink reference signals (e.g. SRS) or signal (e.g. PRACH) in spatial domain is defined.

In accordance with an example embodiment of the invention this dynamic triggering mechanism can comprise assistance information can consist of relative RX reference/ anchor point and/or RX sweep range of spatial filter(s) associated with the network node.

In accordance with example embodiments of the invention this dynamic triggering mechanism can result in operations that can include:
- a relative reference/anchor point can be defined as at least one of the following elements:
  - a compass direction (e.g. north) and/or offset value in angular domain with respect to the compass direction,
  - Transmission Configuration Indicator (TCI) state associated with _Control resource set (CORESET) or TCI state of physical downlink shared channel (PDSCH) or the DL RS resource that is the QCL source or TCI state of physical uplink shared channel or TCI state of physical uplink control channel,
  - SS/PBCH Block Index of the serving cell,
  - CSI-RS resource index /channel state resource indicator (CRI) (wherein a CSI-RS may be associated to specific TRP),
  - PRS resource index, e.g. if UE has active positioning service running at the network, and
  - Sounding reference signal resource indicator (SRI);
- RX beam sweep range in spatial domain can be defined as at least one of the following elements:
  - Relative angle spread in azimuth domain given by +−x degrees with respect to the relative reference point. The angle spread can be a bit vector with length of L-bits, where each element of the vector is mapped with some RRC/MAC CE pre-configured angle spread values,
  - Relative angle spread in elevation domain given by +−y degrees with respect to the relative reference point. The angle spread can be a bit vector with length of L-bits, where each element of the vector is mapped with some RRC/MAC CE pre-configured angle spread values, and
  - Granularity of the sweep in azimuth and/or elevation domains according to capability of network device. The sweeping granularity can be a bit vector with length of K-bits, where each element of the vector is mapped with some RRC/MAC CE pre-configured sweeping granularity values;
- a triggering mechanism can be based on physical layer signaling (e.g. DCI via PDCCH) and/or multiple access (MAC) layer via control element (MAC CE) and/or radio resource control (RRC) signaling.

In accordance with example embodiments of the invention there can be, upon reception of assistance information related to relative TX/RX reference/anchor point as well as TX/RX beam sweep range, determining by a network node (e.g. UE or sidelink UE) of transmission/reception spatial filter(s) according to provided information for the transmission/reception of discovery signal transmissions.

In accordance with example embodiments of the invention the network node may be configured to provide or network node (e.g., such as UE or a sidelink UE) may provide assistance information for sweep range reduction to a network device (e.g., such as a gNB) in a separate message or in a request message where the request message can be e.g. the request to initiate connection (such as beam based connection) with another UE.

Such assistance information may include but is not limited to:
- Relative AoA angle associated with specific DL RS e.g. SSB, CSI-RS, PRS. UE may be configured to provide one or multiple reported DL RS+AoA based on e.g. time of flight, RSRP etc.; and
- Relative AoA on specific set of DL RS, based configured set. Where the relative AoA is to a reference point described herein. The assistance information may also include the resource index of the RS reference or an RS resource index is provided by network.

Further, in accordance with example embodiments of the invention a Network node (e.g. UE or sidelink UE) capability information related to TX spatial filter sweeping granularity information is defined. The capability information is associated with TX sweeping granularity consist at least one of the spatial domain angular values azimuth, or elevation.

Assuming the gNB to have at least a rough estimate on the D2D users' positions in the cell coverage, this information can be exploited in accordance with example embodiments of the invention to limit the initial access beam sweep angle spread in D2D or sidelink communications. While at worst case, based on a network device or gNB beams, the sweep angle spread can be limited to at most a half-space, increasingly accurate knowledge of the UE positions can reduce the sweep angle spread significantly further.

Furthermore, if the gNB also has geographical knowledge of the surrounding environment (map of obstacles, e.g., buildings), it can predict the impact of shadowing on the beam sweep angle spread and remove or discard the spatial angels where static blockages occur.

Thus, using information available at the gNB, the initial beam sweep set of N-by-N (assuming both users employ analog frontends with N distinct beam patterns) can be reduced to $M_1$-by-$M_2$<<N-by-N, where $M_1$ and $M_2$ are the informed beam sweep sets of the users based on the relative angular spreads. As each unique beam requires a synchronization signal block, considering only the valid spatial angles thus reduces both the SSB burst length and the required number of SSB bursts, i.e., the initial access latency.

To determine the central angles for the beam sweep sets for both TX and RX users in D2D, we highlight two anchoring/reference methods: 1) using beam as reference so that gNB informs to the user the target direction difference vs. reference beam and 2) using a static reference point known at gNB and device, e.g. compass north.

Figure 1:
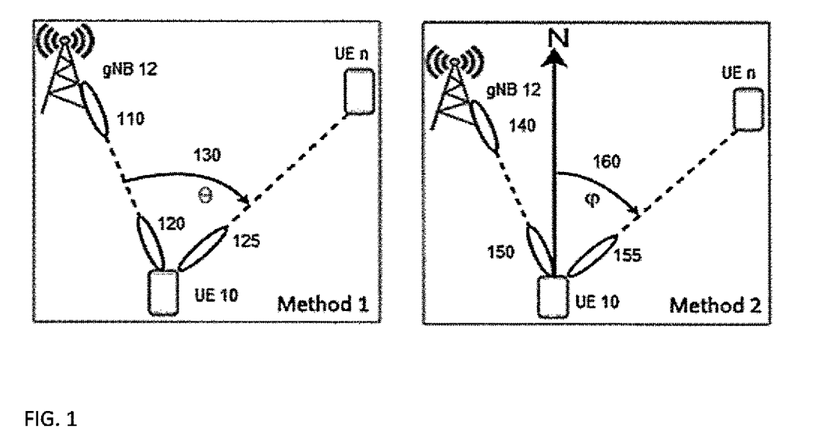
FIG. 1 shows two methods of finding the central beam sweep angle using different references.

The methods in accordance with example embodiments of the invention are illustrated in FIG. 1.

FIG. 1 shows two methods of finding the central beam sweep angle using different references.

In method 1 of FIG. 1 there is shown a beam-reference method using beam as a reference in accordance with example embodiments of the invention. As shown in method 1 of FIG. 1 the gNB 12 provides assistance information 110 to the UE 10. This assistance information 110 can include an indication of a relative reference point as determined by the gNB 12 based on a reference beam. The assistance information 110 for use by the UE 10 following step 120 to determine a steering angle 130 as shown in method 1 of FIG. 1. In response to determining as shown in method 1 of FIG. 1 a beam based on the assistance information the UE 10 communicates signalling 125 including a discovery signal towards another UE n for establishing device-to-device or sidelink communication.

In accordance with example embodiments of the invention the beam-reference method assumes the gNB has knowledge of the user's beam angle, and at least limited knowledge of users' positions. Thus, the gNB can calculate a central angle where the user is likely to find its target D2D or sidelink partner node, using the beam as reference. The difference between the reference beam and the central angle, the steering angle θ can be then informed to the user which can center a beam sweep around or based on this angle.

FIG. 1 also shows a method 2 which illustrates a method using a static reference point known at a gNB 12 and the UE 10 of FIG. 1 in accordance with example embodiments of the invention.

As shown in method 2 of FIG. 1 the gNB 12 sends in assistance information 140 including an indication of a static reference point for use by the UE 10 to determine, following step 150 reception, an angle 160 where the UE 10 is to find the target UE n. In response to determining the angle 160 based on the assistance information the UE 10 communicates signalling 155 including a discovery signal at the angle 160 towards another UE n for establishing device-to-device/sidelink communication.

The static reference point method assumes the gNB has limited knowledge of users' positions. In similar manner to method 1, the gNB can calculate a central angle based on a fixed reference direction known throughout the cell, for example, the compass North-direction, or a hard-coded direction in industrial applications. Using this static reference and information of users' positions, the gNB can find the angle where the user is likely to find its target D2D/sidelink partner node, and inform the user of the necessary angle φ. Finally, using the gNB feedback of the central angle, the user can limit its sweeping set toward the target D2D/sidelink partner node by exploiting the static reference point.

The methods above can be applied for both partners of the D2D connection, provided they are both assisted by the gNB in the initial access procedure.

However, as the user positioning information can be faulty, further information to limit the sweep set should also be exploited. In addition to the central angle θ (or φ), the gNB can also calculate a relative angle spread Δθ (or Δφ) based on the accuracy of the user positioning information, as illustrated in FIG. 2.

Figure 2:
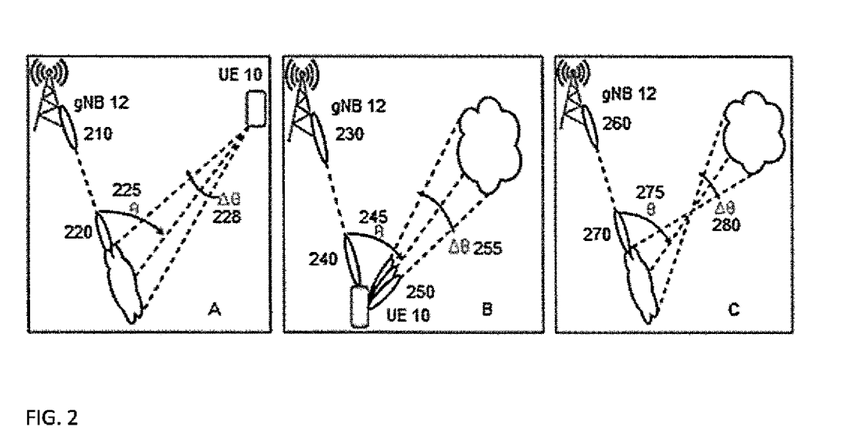
FIG. 2 shows illustrates finding the central angle and relative angle spread with inaccurate user positioning information, with regards to method 1 of FIG. 1.

FIG. 2 shows three operations in accordance with example embodiments of the invention for finding the central angle and relative angle spread with inaccurate user positioning information (illustration for method 1).

In operation A of FIG. 2 the gNB 12 sends in assistance information 210 including an indication of a central angle 225 for use by the UE 10 to determine, following step 220 reception, an angle spread where the UE 10 is to find the target UE n. In response to determining the angle spread based on the assistance information the UE 10 communicates signalling including a discovery signal towards the UE n for establishing device-to-device/sidelink communication using a set of sweep angles 228 based on a difference between a reference beam and the central angle.

In operation B of FIG. 2 the gNB 12 sends in assistance information 230 including an indication of a central angle 245 for use by the UE 10 to determine, following step 240 reception, an angle spread where the UE 10 is to find the target UE n. In response to determining the angle spread based on the assistance information the UE 10 communicates signalling including a discovery signal towards a network cloud for reception by another UE n using a set of sweep angles 250 based on a determined relative angle spread 255 for establishing device-to-device/sidelink communication.

In operation C of FIG. 2 the gNB 12 sends in assistance information 260 including an indication of a central angle 275 for use by the UE 10 to determine, following step 270 reception, an angle spread where the UE 10 is to find the target UE n. In response to determining the angle spread based on the assistance information the UE 10 communicates signalling including a discovery signal towards a network cloud for reception by another UE n using a set of sweep angles based on a determined relative angle spread 280 for establishing device-to-device/sidelink communication.

Furthermore, this initial set of sweeping angles can be reduced further through geographical knowledge at the gNB. Knowledge of static blockages in the cell coverage can be considered when calculating the beam sweep set, subtracting/removing non-line-of-sight (NLOS) angles based on users' positions.

Calculating the central angle and the sweep set can be done at the gNB, separately for both partners of the D2D/sidelink connection, and informed to the participants along other network-controlled initial access information. The gNB does not need to know the antenna panel arrangement of the users, as they can determine their beam sweeps based on a reference point and the angular information provided by the gNB.

Figure 4A:
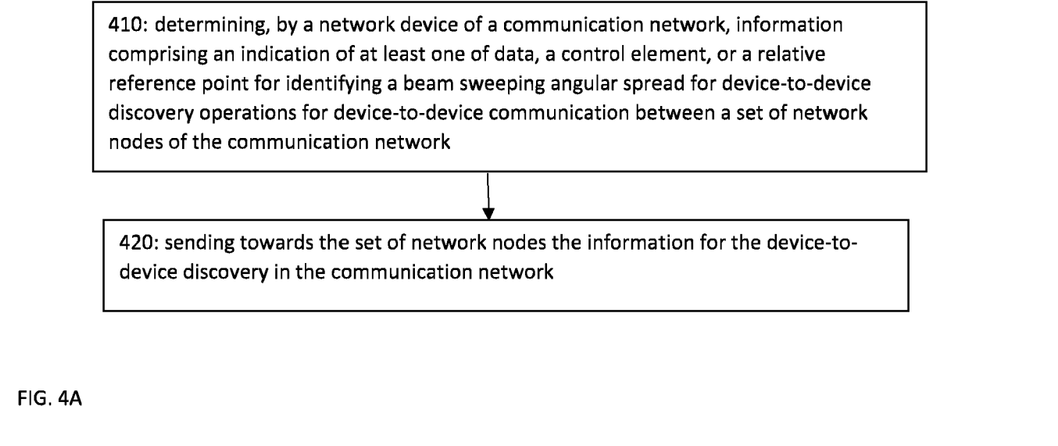
FIG. 4A and FIG. 4B each show a method which can be performed by an apparatus in accordance with example embodiments of the invention.
Figure 4B:
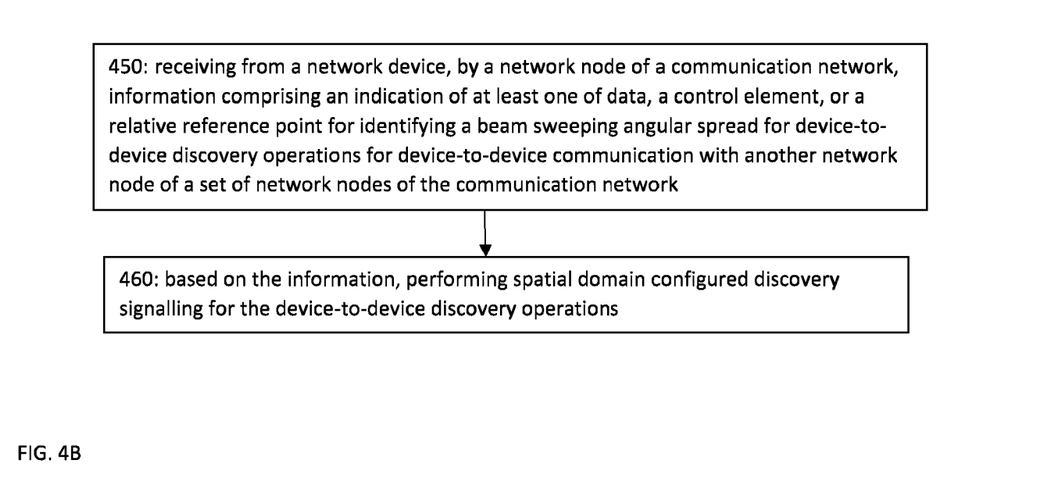

FIG. 4A and FIG. 4B each show a method which can be performed by an apparatus in accordance with example embodiments of the invention.

FIG. 4A illustrates operations which may be performed by a device such as, but not limited to, a device such as a gNB 12 as in FIG. 3.

As shown in step 410 of FIG. 4A there is determining, by a network device of a communication network, information comprising an indication of at least one of data, a control information, or a relative reference point for identifying a beam sweeping angular spread for device-to-device or sidelink discovery operations for device-to-device/sidelink communication between a set of network nodes of the communication network. Then as shown in step 420 of FIG. 4A there is sending towards the set of network nodes the information for the device-to-device/sidelink discovery in the communication network.

In accordance with the example embodiments as described in the paragraph above, wherein the beam sweeping angular spread is at least for use by transmitting nodes of the set of network nodes to transmit spatial domain configured discovery signals and for use by receiving nodes of the set of network nodes to receive spatial domain configured discovery signals.

In accordance with the example embodiments as described in the paragraphs above, wherein the beam sweeping angular spread for the spatial domain configured discovery signals is with respect to one of the relative reference point or according to a capability of network nodes of the set of network nodes.

In accordance with the example embodiments as described in the paragraphs above, wherein the capability of the network nodes is associated with a sweeping granularity of the set of network nodes.

In accordance with the example embodiments as described in the paragraphs above, wherein the spatial domain configured discovery signal comprises at least one of a synchronization signal block, sidelink synchronization signal block resources, or an uplink reference signal resources.

In accordance with the example embodiments as described in the paragraphs above, wherein the indication of the at least one of data, a control information, or a relative reference point is defined in the information using at least one of a direction or offset value in the spatial domain, a transmission configuration indicator, a synchronization signal block index of a serving cell, channel state information reference signal resource index, a positioning reference signal resource index, or a sounding reference signal resource indicator.

In accordance with the example embodiments as described in the paragraphs above, wherein the beam sweeping angular spread is determined one of using a beam associated with the at least one of data, a control element, or a relative reference point as a reference or using a static reference point known by the network device.

In accordance with the example embodiments as described in the paragraphs above, wherein the information is for use to determine a central beam sweep angle for the beam sweeping angular spread using a beam associated with the at least one of data, a control information, or a relative reference point as a reference.

In accordance with the example embodiments as described in the paragraphs above, wherein the central beam sweep angle is determined based on a predetermined fixed reference.

In accordance with the example embodiments as described in the paragraphs above, wherein the information is for use by the set of network nodes to determine a steering angle, wherein the steering angle is based on a difference between the static reference point and the central beam sweep angle.

A non-transitory computer-readable medium (MEM 12B as in FIG. 3) storing program code (PROG 12C as in FIG. 3), the program code executed by at least one processor (DP 12A as in FIG. 3) to perform the operations as at least described in the paragraphs above.

In accordance with the example embodiments as described in the paragraphs above, there is receiving from a network node of the set of network nodes assistance information for a sweep range reduction of the beam sweeping angular spread, wherein the assistance information comprises at least one of a relative angle of arrival associated with a specific set of downlink reference signals or a resource index of downlink reference signals or uplink reference signal or a resource index of uplink reference signals.

In accordance with the example embodiments as described in the paragraphs above, wherein the determining and providing is triggered at the network device based on at least one of physical layer signaling, multiple access layer signaling via control element, or radio resource control signaling from at least one network node of the set of network nodes.

In accordance with an example embodiment of the invention as described above there is an apparatus comprising: means for determining (TRANS 12D, MEM 12B, PROG 12C, and DP 12A as in FIG. 3), by a network device (e.g., gNB 12 as in FIG. 3) of a communication network (e.g., network 1 as in FIG. 3), information comprising an indication of at least one of data, a control element, or a relative reference point for identifying a beam sweeping angular spread for device-to-device discovery operations for device-to-device communication between a set of network nodes of the communication network; and means for sending (TRANS 12D, MEM 12B, PROG 12C, and DP 12A as in FIG. 3) towards the set of network nodes (e.g., including UE 10 and/or NN 13 as in FIG. 3) the information for the device-to-device/sidelink discovery in the communication network.

In the example aspect of the invention according to the paragraph above, wherein at least the means for determining and sending comprises transceiver [TRANS 12D as in FIG. 3] a non-transitory computer readable medium [MEM 12B as in FIG. 3] encoded with a computer program [PROG 12C as in FIG. 3] executable by at least one processor [DP 12A as in FIG. 3].

FIG. 4B illustrates operations which may be performed by a device such as, but not limited to, a device such as a UE 10 as in FIG. 3.

As shown in step 450 of FIG. 4B there is receiving from a network device, by a network node of a communication network, information comprising an indication of at least one of data, a control element, or a relative reference point for identifying a beam sweeping angular spread for device-to-device discovery operations for device-to-device communication with another network node of a set of network nodes of the communication network. Then as shown in step 460 of FIG. 4B there is, based on the information, performing spatial domain configured discovery signalling for the device-to-device/sidelink discovery operations.

In accordance with the example embodiments as described in the paragraph above, wherein the performing comprises using the information for one of transmitting of spatial domain configured discovery signals or reception of spatial domain configured discovery signals for the device-to-device/sidelink communication.

In accordance with the example embodiments as described in the paragraphs above, there is, based on the information, determining a capability associated with spatial filter sweeping granularity for one of transmission or reception spatial filter(s) for the transmitting or the reception of spatial domain configured discovery signals.

In accordance with the example embodiments as described in the paragraphs above, wherein the capability associated with spatial filter sweeping granularity is based on at least one of spatial domain angular values azimuth or spatial domain angular elevation of the network node.

In accordance with the example embodiments as described in the paragraphs above, wherein the beam sweeping angular spread for the spatial domain configured discovery signals is with respect to one of the relative reference point or according to a capability of the network node.

In accordance with the example embodiments as described in the paragraphs above, wherein the spatial domain configured discovery signal comprises at least one of a synchronization signal block, sidelink synchronization signal block resources, or an uplink reference signal resources.

In accordance with the example embodiments as described in the paragraphs above, wherein the indication of the at least one of data, a control information, or a relative reference point is defined in the information using at least one of a direction or offset value in the spatial domain, a transmission configuration indicator state associated with downlink or uplink, an synchronization signal block index of a serving cell, channel state information reference signal resource, a positioning reference signal resource index, or a sounding reference signal resource indicator.

In accordance with the example embodiments as described in the paragraphs above, wherein the beam sweeping angular spread is based on one of using a beam associated with the at least one of data, a control information, or a relative reference point as a reference or using a static reference point known by the network device.

In accordance with the example embodiments as described in the paragraphs above, wherein the information is used to determine a central beam sweep angle for the beam sweeping angular spread using a beam associated with the at least one of data, a control information, or a relative reference point as a reference.

In accordance with the example embodiments as described in the paragraphs above, wherein the central beam sweep angle is based on a predetermined fixed reference.

In accordance with the example embodiments as described in the paragraphs above, wherein the performing comprises determining a steering angle based on a difference between the static reference point and the central beam sweep angle.

In accordance with the example embodiments as described in the paragraphs above, there is sending towards the network device assistance information for a sweep range reduction of the beam sweeping angular spread, wherein the assistance information comprises at least one of a relative angle of arrival associated with a specific set of downlink reference signals or a resource index of reference of downlink signals or uplink reference signal or a resource index of uplink reference signals.

In accordance with the example embodiments as described in the paragraphs above, wherein the information is received in response to at least one of physical layer signaling, multiple access layer signaling via control element, or radio resource control signaling from the network node towards the network device.

In the example aspect of the invention according to the paragraph above, wherein at least the means for determining and sending comprises transceiver [TRANS 10D as in FIG. 3] a non-transitory computer readable medium [MEM 10B as in FIG. 3] encoded with a computer program [PROG 10C as in FIG. 3] executable by at least one processor [DP 10A as in FIG. 3].

In accordance with an example embodiment of the invention as described above there is an apparatus comprising: means for receiving [TRANS 10D, MEM 10B, PROG 10C, DP 10A as in FIG. 3] from a network device [e.g., gNB 12 as in FIG. 3], by a network node [e.g., UE 10 as in FIG. 3] of a communication network [E.g., network 1 as in FIG. 3], information comprising an indication of at least one of data, a control information, or a relative reference point for identifying a beam sweeping angular spread for device-to-device/sidelink discovery operations for device-to-device/sidelink communication with another network node of a set of network nodes of the communication network. Then as shown in step 460 of FIG. 4B there is means, based on the information, for performing [TRANS 10D, MEM 10B, PROG 10C, DP 10A as in FIG. 3] spatial domain configured discovery signalling for the device-to-device/sidelink discovery operations.

In the example aspect of the invention according to the paragraph above, wherein at least the means for receiving, identifying, and performing comprises transceiver [TRANS 10D as in FIG. 3] a non-transitory computer readable medium [MEM 10B as in FIG. 3] encoded with a computer program [PROG 10C as in FIG. 3] executable by at least one processor [DP 10A as in FIG. 3].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof

What is claimed is:

1. A method comprising:
receiving from a network device, with a network node of a communication network, information comprising an indication of at least one of data, a control element, or a relative reference point, the indication of the at least one of data, the control element, or the relative reference point being used for identifying a beam sweeping angular spread for device-to-device discovery operations for device-to-device communication;
based on the information, performing spatial domain configured discovery signalling for the device-to-device discovery operations; and
based on the information, determining a capability associated with spatial filter sweeping granularity for one of transmission or reception spatial filter(s) for the transmitting or the reception of the spatial domain configured discovery signals.

2. The method of claim 1, wherein the performing comprises using the information for one of transmitting of spatial domain configured discovery signals or reception of the spatial domain configured discovery signals for the device-to-device communication.

3. The method of claim 1, wherein the capability associated with spatial filter sweeping granularity is based on at least one of a spatial domain angular azimuth or a spatial domain angular elevation of the network node.

4. The method of claim 2, wherein the beam sweeping angular spread for the spatial domain configured discovery signals is with respect to one of the relative reference point or according to a capability of the network node.

5. The method of claim 2, wherein the spatial domain configured discovery signal comprises at least one of a synchronization signal block, sidelink synchronization signal block resources, or an uplink reference signal resources.

6. The method of claim 1, wherein the indication of the at least one of the data, the control element, or the relative reference point is defined in the information using at least one of a direction or an offset value in a spatial domain, a transmission configuration indicator, an synchronization signal block index of a serving cell, channel state information reference signal resource, a positioning reference signal resource index, or a sounding reference signal resource indicator.

7. The method of claim 1, wherein the beam sweeping angular spread is based on one of using a beam associated with the at least one of the data, the control element, or the relative reference point as a reference or using a static reference point known by the network device.

8. The method of claim 7, wherein the information is used to determine a central beam sweep angle for the beam sweeping angular spread using the beam associated with the at least one of the data, the control element, or the relative reference point as a reference.

9. The method of claim 8, wherein the central beam sweep angle is based on a predetermined fixed reference.

10. The method of claim 8, wherein the performing comprises determining a steering angle based on a difference between the static reference point and the central beam sweep angle.

11. The method of claim 1, comprising:
sending towards the network device assistance information for a sweep range reduction of the beam sweeping angular spread, wherein the assistance information comprises at least one of a relative angle of arrival associated with a specific set of downlink reference signals or a resource index of reference of downlink signals or uplink reference signal or a resource index of uplink reference signals.

12. The method of claim 1, wherein the information is received in response to at least one of physical layer signaling, multiple access layer signaling via control element, or radio resource control signaling from the network node towards the network device.

13. An apparatus comprising:
a circuitry comprising at least one processor and at least one non-transitory memory including computer program code, the at least one non-transitory memory and the computer program code configured to, with the at least one processor, cause the apparatus to:
determine, with a network device of a communication network, information comprising an indication of at least one of data, a control element, or a relative reference point, the indication of the at least one of data, the control element, or the relative reference point being used for identifying a beam sweeping angular spread for device-to-device discovery operations for device-to-device communication,
wherein the indication of the at least one of the data, the control element, or the relative reference point is defined in the information using at least one of a direction or an offset value in a spatial domain, a transmission configuration indicator, an synchronization signal block index of a serving cell, channel state information reference signal resource, a positioning reference signal resource index, or a sounding reference signal resource indicator; and
send towards a set of network nodes the information for the device-to-device discovery in the communication network.

14. An apparatus comprising:
a circuitry comprising at least one processor and at least one non-transitory memory including computer program code, the at least one non-transitory memory and the computer program code configured to, with the at least one processor, cause the apparatus to:
receive from a network device, with a network node of a communication network, information comprising an indication of at least one of data, a control information, or a relative reference point, the indication of the at least one of data, the control element, or the relative reference point being used for identifying a beam sweeping angular spread for device-to-device discovery operations for device-to-device communication,
wherein the indication of the at least one of the data, the control information, or the relative reference point is defined in the information using at least one of a direction or an offset value in a spatial domain, a transmission configuration indicator, an synchronization signal block index of a serving cell, channel state information reference signal resource, a positioning reference signal resource index, or a sounding reference signal resource indicator; and
perform, based on the information, spatial domain configured discovery signalling for the device-to-device discovery operations.

15. A non-transitory computer-readable medium storing program code, the program code executed by at least one processor to perform the device-to-device discovery operations according to claim 1.

16. The apparatus of claim 14, wherein the at least one memory and the computer program code are configured to, with the at least one processor, cause the apparatus to use the information for one of transmitting of spatial domain configured discovery signals or reception of the spatial domain configured discovery signals for the device-to-device communication.

17. The apparatus of claim 16, wherein the beam sweeping angular spread for the spatial domain configured discovery signals is with respect to one of the relative reference point or according to a capability of the network node.

18. The apparatus of claim 14, wherein the beam sweeping angular spread is based on one of using a beam associated with the at least one of the data, the control information, or the relative reference point as a reference or using a static reference point known by the network device.

* * * * *